May 24, 1932. G. A. BUTTRESS 1,859,354
MEANS FOR FORMING FACING SHEETS FOR FABRICATED LATH
Filed Jan. 15, 1930 4 Sheets-Sheet 1
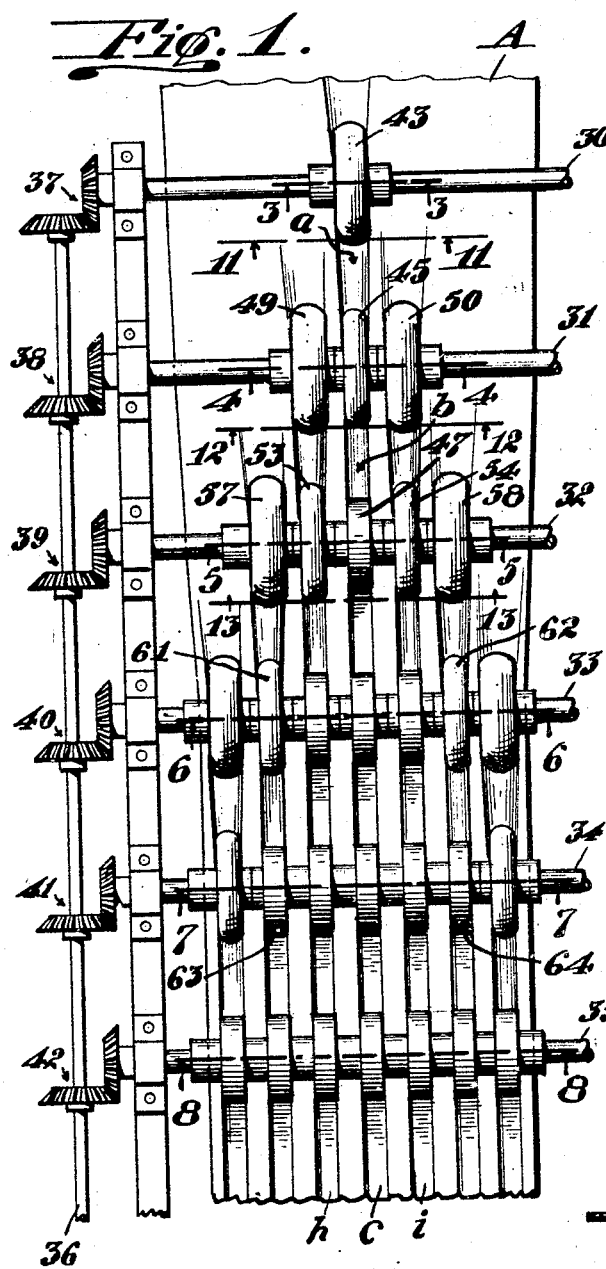
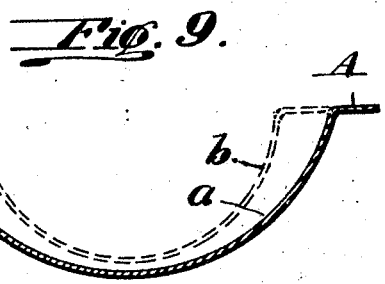
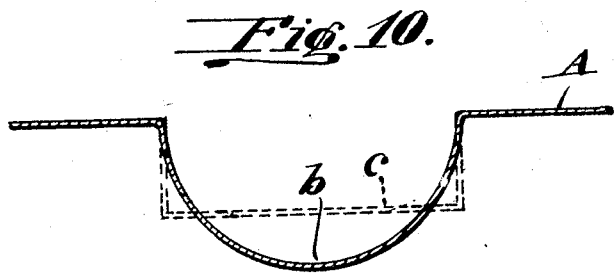
Inventor:
George A. Buttress;
By R. S. Berry
Atty.

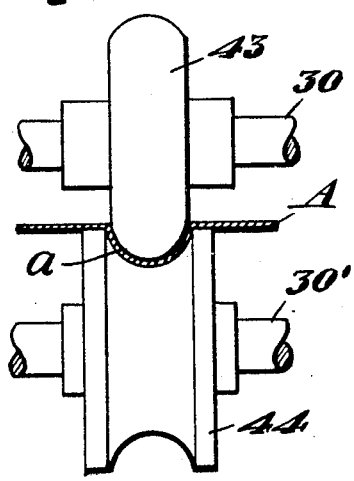
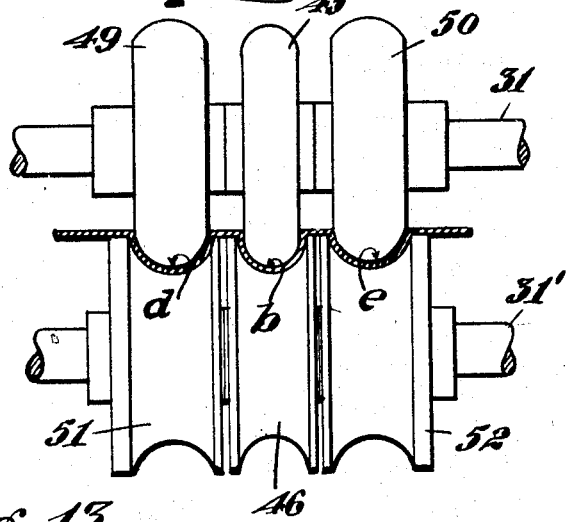
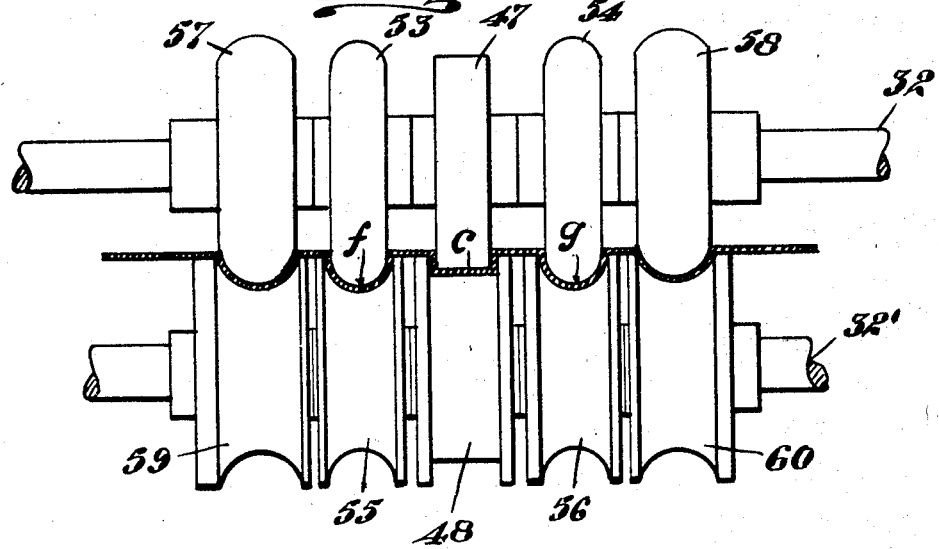

May 24, 1932.    G. A. BUTTRESS    1,859,354
MEANS FOR FORMING FACING SHEETS FOR FABRICATED LATH
Filed Jan. 15, 1930    4 Sheets-Sheet 3

Inventor
George A. Buttress
By R. S. Berry
Atty.

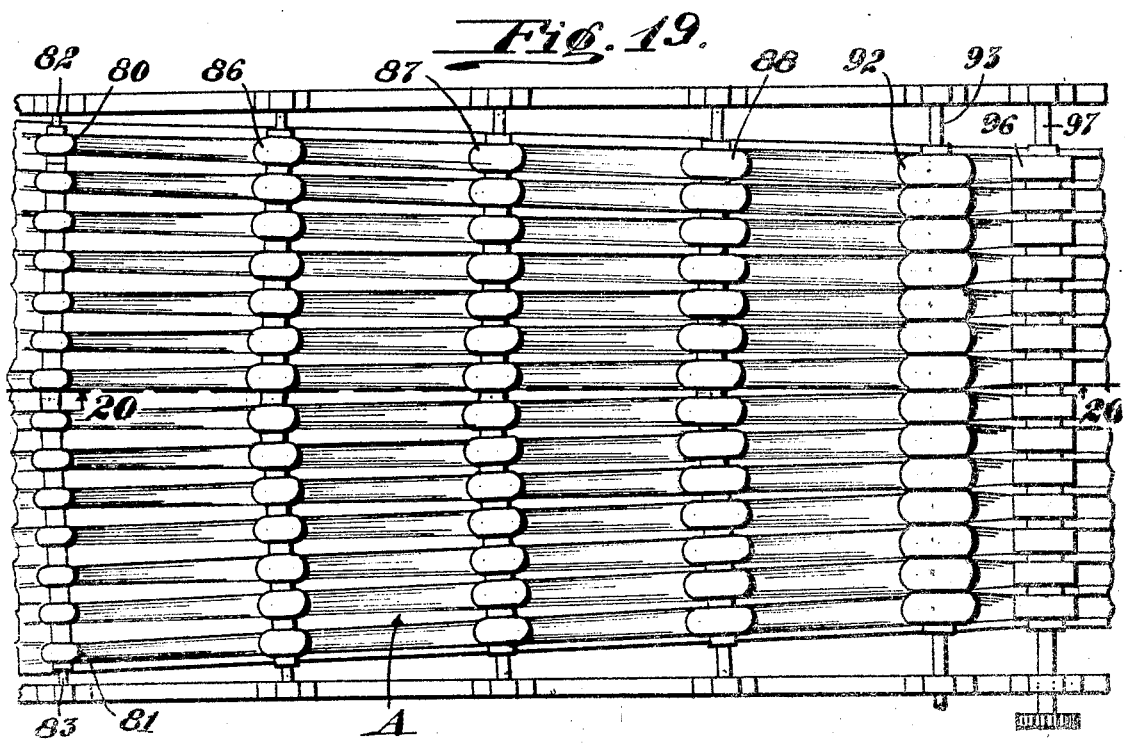
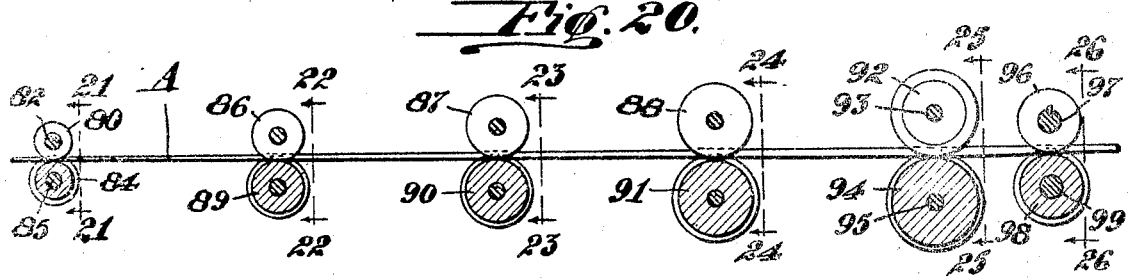
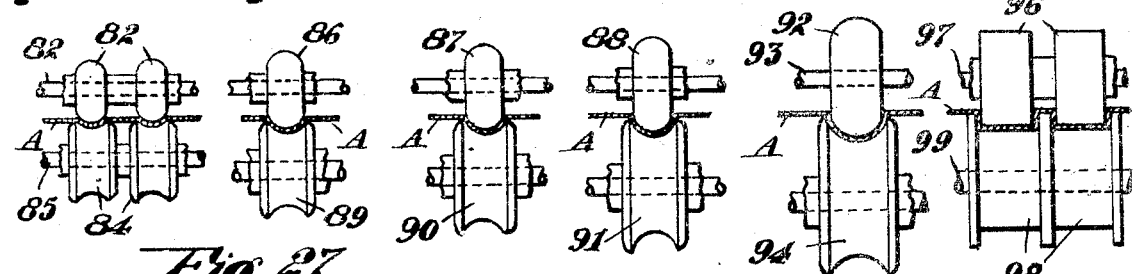
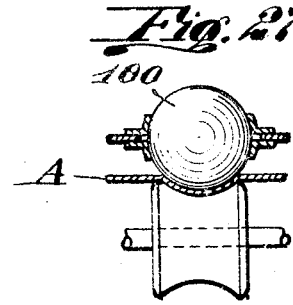
Inventor
George A. Buttress
By R. S. Berry
Atty.

Patented May 24, 1932

1,859,354

UNITED STATES PATENT OFFICE

GEORGE A. BUTTRESS, OF LOS ANGELES, CALIFORNIA, ASSIGNOR TO F. AND B. HOLDING COMPANY, OF LOS ANGELES, CALIFORNIA, A CORPORATION OF CALIFORNIA

MEANS FOR FORMING FACING SHEETS FOR FABRICATED LATHS

Application filed January 15, 1930. Serial No. 420,994.

This invention relates to means and method for making a facing sheet for fabricated lath and more particularly pertains to the manufacture of a corrugated fibrous sheet for the reception of a plastic composition in forming a sheet lath such as is set forth in my co-pending application for United States Patent, Serial No 236,081, allowed November 1, 1929.

An object of the invention is to provide a means and method of forming a ribbon of sheet fibrous material, such as paper, with longitudinally extending flutes or channels whereby such flutes or channels will extend longitudinally in the direction of the grain of the sheet material so as to minimize the possibility of breaking of the fibers of the sheet at the bends thereof and obviating any necessity of scoring the sheet as is generally required where flexible fibrous sheet material such as pulp-board is bent to form corrugations extending transversely of the grain thereof.

Another object is to provide a means and method whereby the forming of a ribbon of sheet material with longitudinally extending corrugations or flutes may be effected in a continuous operation.

Another object is to provide a means and method for converting a flat ribbon of sheet fibrous material into a corrugated ribbon having longitudinally extending flutes or channels in which the sheet material will be subjected to little or no stretching action in effecting the formation of the flutes or channels and whereby weakening of the material as would ordinarily occur by reason of stretching same is obviated.

Another object is to provide a means and method of forming a sheet fibrous material with corrugations or flutes of substantially rectangular cross-section and whereby the sheet material is gradually drawn and worked to the required shape in such manner as to avoid rupture of the sheet material during working thereof.

With the foregoing objects in view, together with such other objects and advantages as may subsequently appear, the invention resides in the steps and features hereinafter set forth and claimed and illustrated by way of example in the accompanying drawings in which:

Fig. 1 is a plan view illustrating a mechanism for, and the manner of, carrying the invention into effect;

Fig. 2 is a detail in cross-section illustrating a flat sheet of fibrous material previous to effecting corrugation thereof;

Fig. 3 is a detail in cross-section of the sheet material as seen on the line 3—3 of Fig. 1, illustrating the manner of initially forming a corrugation;

Fig. 4 is a detail in cross-section as seen on the line 4—4 of Fig. 1 illustrating a second step of working the sheet material;

Fig. 5 is a view in section taken on the line 5—5 of Fig. 1 showing the third step of working the material;

Fig. 6 is a view in section as seen on the line 6—6 showing the fourth step of working the material;

Fig. 7 is a view in section taken on the line 7—7 of Fig. 1 showing the fifth step of working the material;

Fig. 8 is a view in section taken on the line 8—8 of Fig. 1 showing the last step of forming the material;

Fig. 9 is a view in section illustrating the first and second steps employed in forming the sheet material with a corrugation;

Fig. 10 is a detail in section illustrating the final step of forming the sheet material into a rectangular corrugation;

Fig. 11 is a detail in section and elevation as seen on the line 11—11 of Fig. 1;

Fig. 12 is a view in section and elevation taken on the line 12—12 of Fig. 1;

Fig. 13 is a view in section and elevation taken on the line 13—13 of Fig. 1;

Fig. 19 is a plan view illustrating a further modification of the invention;

Fig. 20 is a diagrammatic view in longitudinal section taken on the line 20—20 of Fig. 19;

Fig. 21 is a view in section as seen on the line 21—21 of Fig. 20;

Fig. 22 is a view in section as seen on the line 22—22 of Fig. 20;

Fig. 23 is a view in section as seen on the line 23—23 of Fig. 20;

Fig. 24 is a view in section as seen on the line 24—24 of Fig. 20;

Fig. 25 is a view in section as seen on the line 25—25 of Fig. 20;

Fig. 26 is a view in section as seen on the line 26—26 of Fig. 20;

Fig. 27 is a detail in section and elevation illustrating a modified form of the forming rollers employed in the structure illustrated in Fig. 19.

The method constituting the present invention consists generally in taking a ribbon or strip of plain sheet fibrous material, such as paper or pulp board of the character employed in the manufacture of composition wall boards, and subjecting the sheet to successive operations whereby the plain sheet is converted into a ribbon or strip having a series of longitudinally extending flutes or corrugations of substantially rectangular cross sections. As here shown, the ribbon is initially formed with a series of channels or grooves of arcuate or curved cross section by drawing or gathering the sheet transversely, and finally working the walls of the channels or grooves to form flutes or corrugations of substantially rectangular cross section. The invention contemplates forming the channels or grooves and the finished flutes or corrugations without materially stretching the stock of the fibrous sheet while so doing and while continuously advancing the sheet.

In carrying out the method, a ribbon of sheet fibrous material is pulled longitudinally between a series of sets of suitable forming devices and thereby initially formed with one or more longitudinal channels or grooves of arcuate or curved cross section; the material of the ribbon being pulled or gathered inwardly from its margins to form the walls of the channels or grooves without stretching the material. The stock constituting the channels or grooves is then worked to convert the channels or grooves of arcuate cross section into flutes or corrugations of substantially rectangular cross section, whereby the stock constituting the curved walls of the channels or grooves will then form the bottom and side walls of the flutes or corrugations and whereby the flutes or corrugations will have their walls of a transverse surface length corresponding to the transverse length of previously formed grooves. Thus, in effect, corrugating of the ribbon is accomplished by gathering the material thereof inwardly from its side margins to form the walls of the corrugations.

Inasmuch as the fibrous material employed comprises pulp board or paper which is formed of matted fibers extending in the general direction of the length of the ribbon, the bends made in the ribbon in forming the channels or grooves and the finished flutes or corrugations will extend lengthwise of the fibers or in the direction of the grain of the material. Because of this the formation of the fluted ribbon is readily effected and without materially weakening of the material as is the case where pulp board or paper is corrugated transversely of the grain. Tests have shown that the product thus formed is approximately one-third stronger than where corrugated crosswise of the fibers or grains.

Figure 14:
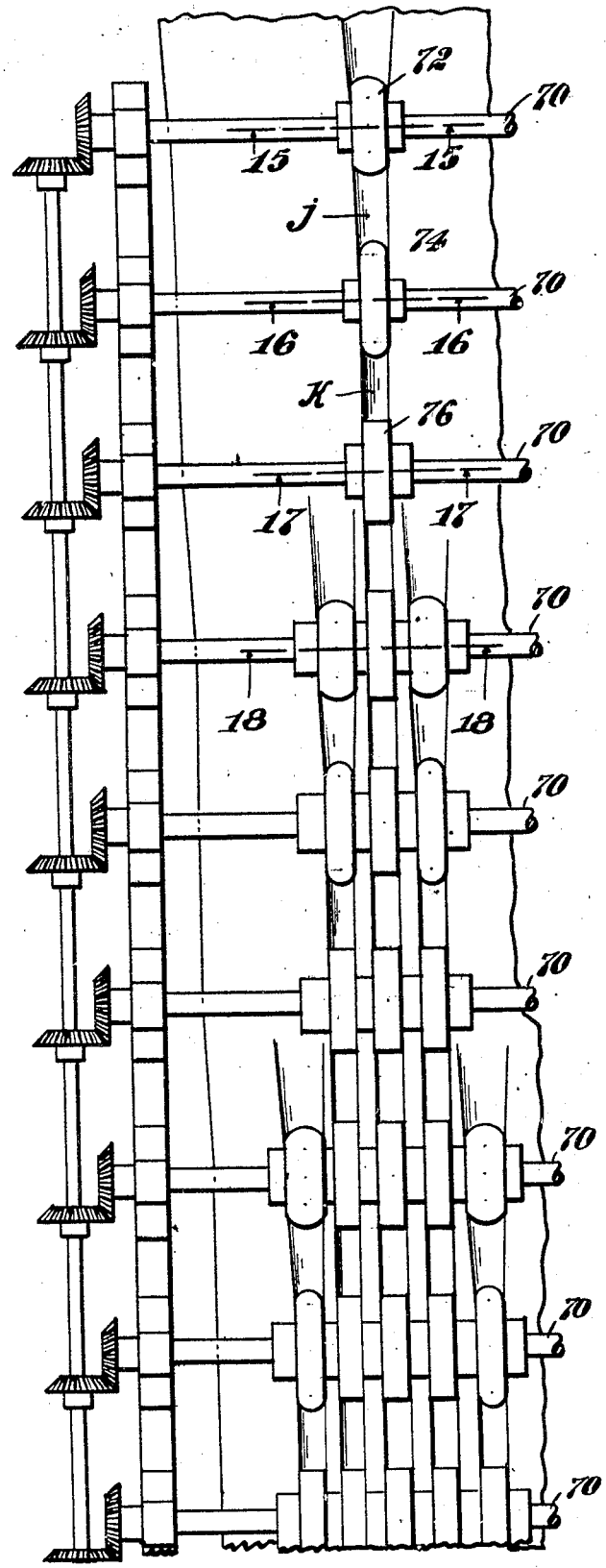
Fig. 14 is a plan view illustrating another form of mechanism for carrying the invention into effect.

The modes of carrying the invention into effect both as to the method and the mechanism, are subject to variation, several of which are here shown in Figures 1, 14 and 19 with their associated views.

The mechanism employed in the form of the invention shown in Fig. 1 embodies a series of spaced parallel driven shafts 30, 31, 32, 33, 34 and 35 which are rotated in unison from a drive shaft 36 geared to the driven shafts by sets of gears 37, 38, 39, 40, 41 and 42. Each of the driven shafts is fitted with a series of rollers to be later described, and arranged beneath, and extending parallel with each of the driven shafts, is a companion shaft, as indicated at 30', 31' and 32' in Figures 11, 12 and 13 respectively, on which companion shafts are mounted idle rollers for cooperation with the rollers on the driven shafts. In the arrangement here shown the shaft 30 has fixed thereon a gathering roller 43 which is formed with a transversely arched periphery and mounted on the shaft 30' beneath the roller 43 is a roller 44 formed with a peripheral groove of arcuate cross section. The contiguous shaft 31 is fitted with an idle roller 45 arranged with the center of its periphery in alignment with the center of the periphery of the roller 43 on the shaft 30, which roller 45 is of slightly less diameter and width than the roller 43, and which roller is formed with a transversely curved or arcuate periphery, and loosely mounted on the shaft 31' beneath the roller 45 is a roller 46 formed with a peripheral groove of arcuate cross section. Loosely mounted on the shaft 32 is a roller 47 arranged with the center of its periphery in alignment with the center of the periphery of the roller 45 on the shaft 41 which roller 47 is of slightly less diameter than the roller 45 and is of corresponding width, and loosely mounted on the shaft 32' beneath the roller 47 is a roller 48 formed with an annular channel of rectangular cross section. The shafts 33, 34 and 35 are fitted with idle rollers corresponding to the rollers 47 beneath which are arranged rollers complementary to the rollers 48.

Fixed on the shaft 31 on opposite sides of the roller 45 are gathering rollers 49 and 50 corresponding to the rollers 43 and mounted on the shaft 31' beneath the rollers 49 and 50 are rollers 51 and 52 corresponding to the roller 44.

Mounted on the shaft 32 on opposite sides of the roller 47 are rollers 53 and 54 corresponding to the roller 45 and mounted on the shaft 32' beneath the rollers 53 and 54 are rollers 55 and 56 corresponding to the roller 46 and loosely mounted on the shaft 33 in alignment with the rollers 53 and 54 are rollers corresponding to the rollers 47 beneath which are rollers corresponding to the rollers 48. In like manner, gathering rollers 57 and 58 are fixed on the shaft 32 adjacent the outer sides of the rollers 53 and 54 and arranged beneath these rollers on the shaft 32' are grooved rollers 59 and 60 corresponding to the roller 44 and loosely mounted on the shaft 33 in central alignment with the rollers 57 and 58 are rollers 61 and 62 corresponding to the rollers 45 which cooperate with rollers arranged therebeneath corresponding to the rollers 46. The shaft 34 carries rollers 63 and 64 aligned with the rollers 61 and 62 and arranged therebeneath are cooperating rollers corresponding to the rollers 48. In like manner, the shafts 33, 34 and 35 are equipped respectively with forming rollers corresponding to roller 43 and with rollers corresponding with rollers 45 and 47. As many driven shafts with arrangements of rollers as specified may be provided as occasion may require according to the width of the ribbon of sheet fibrous material to be worked.

In the operation of the mechanism just described the ribbon A of sheet fibrous material is fed longitudinally between the several sets of rollers. The rollers 43 and 44 are arranged on their respective shafts to be disposed approximately intermediate the side margins of the ribbon A and are so spaced in close proximity to each other that when the ribbon A is passed therebetween the material of the ribbon will be drawn inwardly from its margins and bent downwardly to form the ribbon with an intermediate longitudinally extending channel $a$ of arcuate cross section, as particularly shown in Figs. 3, 9 and 11. As the ribbon advances between the rollers on the shafts 31 and 31', the rollers 45 and 46 work the stock constituting the walls of the channel $a$ to form a groove $b$ as shown in dotted lines in Fig. 9 and in full lines in Figs. 4 and 10, which groove is of less width and depth than the channel $a$, then as the ribbon advances between the rollers 47 and 48 on the shafts 32 and 32' these rollers work the walls of the groove $b$ into a flute or corrugation $c$ of rectangular cross section as shown in Figs. 5, 10 and 13, the walls of which will have a transverse surface length corresponding to the transverse surface length of the walls of the groove $b$. In like manner the gathering rollers 49 and 50 on the shaft 31, with their associated rollers 51 and 52 act on the advancing ribbon to draw the material thereof inwardly from its side margins to form channels $d$ and $e$ of arcuate cross section as shown in Figs. 4 and 12 which are thereafter acted on by the rollers 53 and 54 and their associated rollers 55 and 56 to form the channels $d$ and $e$ into the narrower and shallower grooves $f$ and $g$ as shown in Figs. 5 and 13, which grooves are thereafter converted into rectangular flutes $h$ and $i$ as shown in Fig. 6 by the rollers on the shaft 33 complementary to the flute-forming roller 47.

In like fashion, the ribbon is successively gathered inwardly from its margins by gathering rollers to form channels that are subsequently converted into the grooves and flutes as before described until the ribbon is fluted or corrugated lengthwise throughout its width as shown in Fig. 8. Any suitable number of the sets of the rollers are provided as occasion may require according to the width of the ribbon being worked.

By the arrangement of rollers just described the gathering and fluting of the ribbon is effected progressively as the ribbon advances and by the provision of the gathering rollers of greater width and diameter than the groove-forming rollers, the gathering of the ribbon will be of such wide area as to facilitate drawing in sufficient stock to form the groove $b$ without liability of breaking of the ribbon and permits of the formation of the grooves $b$ and the flutes $c$ of substantial depth. However, in some instances, where the material being worked is sufficiently strong, or the flutes are quite shallow, the gathering rollers may be dispensed with, in which event, the groove-forming rollers 45, 53, 54, etc. will then also serve as gathering rollers.

Figure 15:
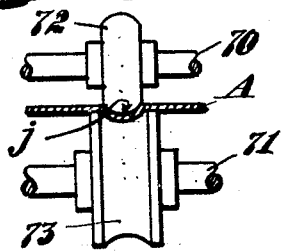
Fig. 15 is a view in section as seen on the line 15—15 of Fig. 14.
Figure 16:
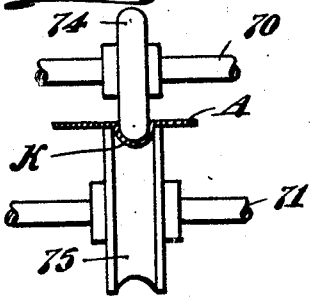
Fig. 16 is a view in section as seen on the line 16—16 of Fig. 14.
Figure 17:
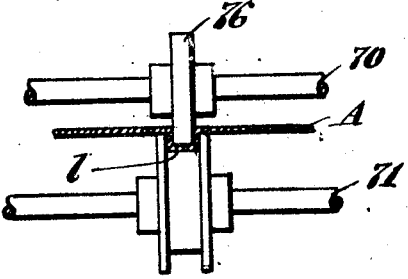
Fig. 17 is a view in section as seen on the line 17—17 of Fig. 14.
Figure 18:
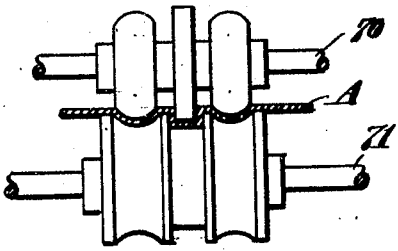
Fig. 18 is a view in section as seen on the line 18—18 of Fig. 14.

In the form of the invention shown in Figs. 14 to 18 inclusive a series of spaced parallel driven shafts 70 are provided of any suitable number beneath each of which extends a shaft 71 and mounted on the leading shaft 70 is a gathering roller 72 which cooperates with a channeled roller 73 on the shaft 71 in gathering a ribbon advancing therebetween into a central longitudinally extending channel $j$ of arcuate cross section, as shown in Fig. 15, and mounted on the contiguous shaft 70 is a groove-forming roller 74 associated with a companion roller 75 arranged therebeneath for converting the channel $j$ into a groove $k$ of arcuate cross section as shown in Fig. 16 and mounted on the succeeding shaft 70 is a flute-forming roller 76 for converting the arcuate channel k into a rectangular flute l as shown in Fig. 17.

The succeeding shafts carry flute-forming rollers aligned with, and corresponding to, the roller 76 and sets of gathering rollers, groove-forming rollers and fluting rollers are provided on the successive shafts in such manner that as the ribbon is advanced between the series of rollers a central flute or corrugation will be initially completely formed and thereafter completed flutes will be formed progressively on opposite sides of the central flute until the ribbon is corrugated throughout its width.

In the form of the invention shown in Fig. 19, a series of sets of gathering rollers 80 and 81 are loosely mounted on shafts 82 and 83 extending in slightly diverging relation to each other which rollers 80 and 81 have transversely rounded peripheries and cooperate with channel rollers 84 on shafts 85 arranged beneath the shafts 82 and 83 to form a ribbon passed therebetween into a series of longitudinally extending channels throughout the width of the ribbon. The rollers 80 and 81, with their companion rollers 84 form channels of very shallow depth. A series of sets of rollers 86, 87 and 88 are arranged successively in alignment with the rollers 80 and 81 with the rollers 86, 87 and 88 of gradually increased diameters. The rollers 86, 87 and 88 cooperate with rollers 89, 90 and 91 arranged therebeneath to effect deepening of the channels initially formed by the rollers 80 and 81.

Another series of rollers 92 is provided, which rollers are affixed to a driven shaft 93 to cooperate with rollers 94 on a shaft 95 to form the channels shaped by the previously named rollers into grooves of arcuate cross section, which grooves are subsequently converted into flutes of rectangular cross section by a series of rollers 96 mounted on a shaft 97 cooperating with rollers 98 on a shaft 99. The various rollers preceding the set of rollers 92 are sufficiently loose and spaced apart that when the ribbon is drawn therebetween the ribbon will be gathered inwardly from its margins throughout the width thereof in forming the series of channels. In some instances, it may be desirable to substitute spheres 100 as shown in Fig. 27 for the rollers 80, 81, 86, 87 and 88 and mounting such spheres for universal movement.

From the foregoing, it will be seen that I have produced a means and method for forming a plain ribbon or strip of sheet fibrous material into a ribbon having longitudinally extending flutes or corrugations of rectangular cross section, and whereby the product is fashioned in a manner which will permit its being produced directly from a roll of the sheet material, as well as from short strips, in practically a continuous operation.

The product thus formed, while being applicable to many uses is especially designed to be employed in the manufacture of fabricated lath, by a continuous process in which the corrugated ribbon is delivered as formed to operators or mechanism whereby the flutes or corrugations on one side of the ribbon are filled with a plastic composition, after which the ribbon is cut to suitable lengths.

I claim:

1. In a machine for forming a facing sheet for fabricated lath, means for gathering the material of a fibrous sheet into parallel grooves having curved walls, and means for forming the grooves into flutes of substantially rectangular cross section.

2. In a machine for forming a facing sheet for fabricated lath, means for drawing the material of a fibrous sheet into parallel grooves having curved walls, and means for forming the grooves into flutes having substantially rectangular cross-sections of a transverse surface length corresponding to the transverse surface length of the previously formed curved walls.

3. In a machine for forming a facing sheet for fabricated lath, means for gathering a fibrous sheet laterally into a series of parallel channels of curved cross-section, means for reducing the channels into grooves and means for finally converting the grooves into flutes of substantially rectangular cross section.

4. In a machine for forming a facing sheet for fabricated lath, means for gathering a fibrous sheet laterally into a series of parallel channels of curved cross section, means for working the channels into narrower grooves of a transverse surface length less than the transverse surface length of the previously formed channels, and means for finally converting the grooves into flutes of substantially rectangular cross section having transverse surface length corresponding to the transverse surface length of the previously formed grooves.

5. In a machine for forming a facing sheet for fabricated lath, means for gathering a fibrous sheet laterally into a series of parallel channels of arcuate cross section, means for reducing the channels into arcuate grooves and means for finally converting the arcuate grooves into flutes of substantially rectangular cross section and to form the finished flutes to have transverse surface lengths corresponding to the transverse surface lengths of the previously formed arcuate grooves.

6. In a machine for forming a facing sheet for fabricated lath, means for gathering a ribbon of sheet fibrous material to form a series of longitudinally extending grooves in said ribbon with the grooves as initially formed of curved cross section, and means for finally working the stock constituting the curved walls of the grooves into corrugations of rectangular cross section having a finished transverse surface length substantially corresponding to the surface length of the previously formed grooves.

7. In a machine for making a facing sheet for fabricated lath, means for advancing a ribbon of sheet fibrous material including means for drawing the material transversely thereof into a series of parallel longitudinally extending channels without materially stretching the material, and means for pressing the material constituting the walls of the channels initially formed to provide the ribbon with longitudinally extending corrugations of substantially rectangular cross section.

8. In a machine for making a facing sheet for fabricated lath, means for advancing a ribbon of sheet fibrous material including rollers for initially forming a longitudinally extending channel of curved wall section arranged to draw the sheet inwardy from its margins to form the wall of the channel, rollers for forming a channel paralleling the first named channel in spaced relation thereto and of corresponding cross section therewith arranged to draw the material of the sheet inwardly from its margin, and rollers for successively and progressively forming like channels until the sheet is formed with a series of longitudinal parallel channels across the width thereof, and for forming the walls on each channel to produce corrugations of rectangular cross section.

9. In a machine for making a facing sheet for fabricated lath, means for advancing a ribbon of sheet fibrous material including rollers for initially forming a longitudinally extending channel of curved wall section arranged to draw the sheet inwardy from its margin to form the wall of the channel, rollers for forming a channel paralleling the first named channel in spaced relation thereto and of corresponding cross section therewith arranged to draw the material of the sheet inwardly from its margin, and rollers for successively and progressively forming like channels across the width of the sheet, means for converting the channels into narrower grooves, and means for working the walls of the grooves to form flutes of rectangular cross section.

10. In a machine for making a facing sheet for fabricated lath, means for advancing a ribbon of sheet fibrous material, means for initially forming the ribbon into a series of parallel channels of arcuate cross section by gathering the material of the sheet inwardly from its margins while advancing the ribbon, and means for rolling the walls of the arcuate channels to form the ribbon with corrugations of substantially rectangular cross sections.

11. In a mechanism for making a facing sheet for fabricated lath from a strip of plain fibrous material, a series of rollers for gathering the strip transversely to form the latter with longitudinally extending grooves of arcuate cross section, and a series of rollers for pressing the walls of the grooves to form the latter into corrugations of rectangular cross sections.

12. In a mechanism for forming a facing sheet for fabricated lath from a plain ribbon of sheet fibrous material, a series of rollers for forming the material with a series of longitudinally extending shallow channels of arcuate cross section, a second series of rollers for forming the channels initially formed by said first named rollers into grooves of less width than the initially formed channels, and a series of finishing rollers for converting the previously formed grooves into flutes of rectangular cross section having a transverse surface length substantially corresponding to the transverse surface length of the previously formed grooves.

GEORGE A. BUTTRESS.